United States Patent Office 3,004,009
Patented Oct. 10, 1961

3,004,009
SUSPENSION COPOLYMERIZATIONS OF VINYL CHLORIDE
Richard G. Dell, Fords, N.J., assignor to Allied Chemical Corporation, a corporation of New York
No Drawing. Filed Mar. 31, 1958, Ser. No. 724,816
12 Claims. (Cl. 260—86.3)

This invention is directed to the copolymerization of vinyl chloride with a $CH_2=C<$ compound polymerizable therewith dispersed in water by the conjoint action of methyl cellulose (also known as methyl cellulose ether) having a solution viscosity of about 4000, and an alkyl aryl sulfonate emulsifier.

The polymerization of vinyl chloride alone or together with other monomers copolymerizable therewith, with the monomers dispersed in water containing a surface active agent and a catalyst for the polymerization, is well known. Depending upon the kind and concentration of surface active agent and agitation of the polymerization mixture, latex-type emulsions of polymer or less finely divided polymer which is filterable from or settles out from the aqueous phase of the reaction product, are obtained. The processes yielding the filtrable polymers are in general characterized by the use of colloidal dispersing agents and are known as "suspension" polymerizations. Processes using emulsifying agents generally yield relatively stable polymer emulsions and are known as "emulsion" polymerizations. It is the former, suspension type of process for copolymerizing vinyl chloride, with which my invention is concerned.

A multitude of various dispersion agents and combinations of such agents with other surface active agents has been disclosed by the prior art for use in suspension polymerizations of vinyl chloride and its copolymerizations with the monoethylenically unsaturated $CH_2=C<$ compounds. In practice, however, it has been found that the characteristics of the polymers differ greatly, depending not only upon the particular dispersants used for a given polymerization, but also for a given dispersant, upon whether it is used in the polymerization of vinyl chloride alone or its copolymerization with another monomer.

The control of particle size to obtain small particles which are readily processed after being recovered by filtration or by allowing them to settle out of the polymerization product, is much more difficult in copolymerizing vinyl chloride with other monoethylenically unsaturated compounds than in the production of polyvinyl chloride by the homopolymerization of vinyl chloride monomer alone dispersed in water containing a dispersing agent. Thus, it has been found that particular dispersants are effective in the polymerization of vinyl chloride to form suspensions of desirably finely divided polyvinyl chloride. When those same dispersants are employed in the suspension copolymerization of vinyl chloride with other monoethylenically unsaturated comonomers, copolymers of an increasingly coarse particle size are obtained as the co-monomer content of the monomer mixture is increased. In many of those copolymerizations, precoagulation of the polymer occurs while the polymerization is taking place, and tight deposits of the polymer form on the walls of the polymerization vessel. These deposits are difficult to remove, but must be removed before they build up to a point at which they interfere with the proper conduct of the polymerization.

I have discovered a particular combination of surface active agents is peculiarly effective in the aqueous suspension copolymerizations of vinyl chloride with other monoethylenically unsaturated compounds to produce copolymers of fine, but filterable particle size, with little or no precoagulation of the copolymers or their deposition on the walls of the polymerization vessel.

In operating in accordance with my invention, a monomer mixture of 10 to 95 parts vinyl chloride and 90 to 5 parts by weight, preferably 50 to 95 parts vinyl chloride to 50 to 5 parts by weight, of one or more other monoethylenically unsaturated $CH_2=C<$ monomers, is polymerized dispersed in water by methyl cellulose having a solution viscosity of about 4000 and an alkyl aryl sulfonate emulsifier in which the aryl nucleus is a benzene or toluene nucleus containing a single $C_{10}$ to $C_{20}$ alkyl substituent. The alkyl aryl sulfonate present amounts to 0.075% to 0.6% by weight of the monomers present, and the methyl cellulose present is at least equal to the alkyl aryl sulfonate.

Preferably, I employ those low salt content, mononuclear alkyl aryl sulfonates in which the benzene or toluene nuclei each contains a single $C_{10}$ to $C_{20}$ alkyl radical substituent which corresponds to a hydrocarbon of petroleum distillates boiling substantially in the range 180° C. to 320° C., the production of which is disclosed in U.S.P. 2,652,427, issued September 15, 1953. Specifically, each of the products produced by the processes of Examples 1 and 3 of that patent is suitably used for carrying out the polymerization processes of my invention.

The process of my invention is especially applicable to the copolymerization of vinyl chloride with other vinyl compounds, particularly with the vinyl esters of the lower fatty acids, e.g. vinyl acetate, or with an acrylate ester.

With respect to the concentrations of the methyl cellulose, they may be those commonly employed in the suspension polymerization of vinyl chloride dispersed in water, with the limitation pointed out above that the amount of methyl cellulose present is at least equal to the amount of alkyl aryl sulfonate. In general, the methyl cellulose may amount to about 0.075% to about 5.0% by weight of the total monomers present, preferably about 0.1% to about 1.0%. For optimum results with respect to obtaining finely divided copolymer passing a 70-mesh U.S. standard screen, the alkyl aryl sulfonate amounts to substantially 0.1% to 0.6% by weight of the monomers present, and the methyl cellulose amounts to substantially 0.3% to 0.8% of the monomers and is at least equal to the weight of the alkyl aryl sulfonate.

My invention is characterized by the use of the particular combination of methyl cellulose dispersant and alkyl aryl sulfonate emulsifying agent as described herein. Other conditions for carrying out the polymerization including the nature and amounts of catalyst, monomer to be copolymerized with the vinyl chloride, and reaction conditions, such as amounts of monomer and water in the reaction mixture, temperature and time of reaction, are those conventionally employed for the aqueous suspension copolymerization of vinyl chloride together with other monoethylenically unsaturated monomers.

The following examples of specific embodiments of my invention are further illustrative thereof. Unless otherwise specified, the amounts of materials are given in parts or percentages by weight.

*Example 1.*—A solution of 0.3 part of methyl cellulose having a solution viscosity of substantially 4000, and 0.2 part of a low salt content alkylbenzene sulfonate marketed under the trademark "Nacconol NRSF," in 200 parts distilled water was charged into a stainless steel bomb and the solution frozen. There was added 0.2 part lauroyl peroxide, 5 parts trichloroethylene and 13 parts vinyl acetate. Liquid vinyl chloride in a small excess over 87 parts was poured into the bomb. The excess vinyl chloride was allowed to evaporate to remove air from the bomb and the bomb then was sealed and tumbled endover-end for a period of 24 hours in a heating bath at 50° C. At the end of this period the reaction mixture was a slurry of powdery polymer in water. The polymer was filtered, washed with water and dried.

In thus operating, there was no visible precoagulation of polymer on the walls of the bomb. A 96% yield of the polymer product was obtained. All the product was finer than 20-mesh, and 95% of it was finer than 70-mesh. On a hot, two-roll mill it fused rapidly and milled readily to a clear, colorless sheet of rigid plastic.

The procedure of this example as described above was repeated employing 0.2 part of methyl cellulose dispersants having solution viscosities ranging from 10 to 1500. With none of these was a fine, powdery copolymer product obtained. None of the polymer was finer than 20 mesh. In every case there was complete precoagulation of polymer on the walls of the polymerization vessel.

The procedure of this example as first described was modified to employ 85 parts vinyl chloride and 15 parts vinyl acetate, 0.2 part of the methyl cellulose dispersant and 0.2 part of the alkyl aryl sulfonate emulsifier. No trichloroethylene was added. A 93% yield of fine powdery copolymer was obtained with practically no precoagulation in the polymerization bomb. One hundred percent of the dried polymer passed a 20-mesh screen and 63% passed a 70-mesh screen.

*Example 2.*—The procedure of Example 1 was scaled up by employing 182 times the amount of each of the materials used in making up the reaction mixture, and carrying out the polymerization in a glass-lined, steel autoclave employing a three-bladed impeller for agitating the reaction mixture. The internal temperature was measured and was controlled by passing steam or cold water through a jacket of the autoclave as required to maintain the reaction mixture at 50° C. After a reaction period of 27 hours, the pressure drop had leveled off, indicating the end of the reaction.

The reaction product thus obtained was a slurry of powdery copolymer in water. The polymer was recovered by centrifuging the slurry and dried. The yield of dried polymer amounted to 86% of the vinyl chloride and vinyl acetate monomers supplied to the reaction. The following are the results of a screening of the dried product:

Screen:                            Percent passed
   14 ------------------------------------- 99.5
   70 ------------------------------------- 96
   200 ------------------------------------ 93

There was almost no precoagulation or deposition of polymer on the autoclave walls.

*Example 3.*—A solution of 0.3 part methyl cellulose having a solution viscosity of substantially 4000 and 0.1 part "Nacconol NRSF" in 200 parts distilled water was frozen in a stainless steel bomb. There was added 0.2 part lauroyl peroxide and 25 parts methyl acrylate. Liquid vinyl chloride in small excess over 75 parts was added and the excess allowed to evaporate to remove air, leaving a 75/25 ratio of vinyl chloride/methyl acrylate in the bomb. The sealed bomb was tumbled end-over-end in a heating bath at 50° C. for 24 hours.

The slurry of powdery copolymer thus obtained was filtered, and the solid copolymer was washed with water and dried. The dried product thus obtained in a yield of 95% of theoretical was 99.9% finer than 20 mesh and 60% finer than 70 mesh. It milled well on a hot roll mill to give a clear, colorless, rigid plastic sheet. There was a barely visible film of precoagulated polymer on the walls of the polymerization bomb.

This same procedure was carried out employing 10 parts vinyl chloride and 90 parts methyl acrylate and 0.2 part of the alkyl aryl sulfonate emulsifier with the 0.3 part methyl cellulose dispersant. The powdery copolymer thus obtained had a particle size such that 97% passed a 20-mesh screen.

*Example 4.*—The process of Example 3 was modified to copolymerize 65 parts of vinyl chloride and 35 parts of 2-ethylhexyl acrylate employing 0.4 part of the methyl cellulose dispersant and 0.2 part of "Nacconol NRSF" emulsifying agent. The dried powdery copolymer thus obtained was all finer than 20 mesh and 57% finer than 70 mesh.

*Example 5.*—Copolymerizing 87 parts vinyl chloride and 13 parts vinyl acetate by the first procedure described in Example 1, but varying the amounts of methyl cellulose and alkyl aryl sulfonate, gave the following results:

| | Parts methyl cellulose | Parts alkyl aryl sulfonate | Precoagulation | Percent product passing 70-mesh screen |
|---|---|---|---|---|
| 1 | 0.2 | 0.0 | Complete | 0 |
| 2 | 0.1 | 0.2 | Complete | 0 |
| 3 | 0.2 | 0.3 | Considerable | 11 |
| 4 | 0.2 | 0.1 | 0 | 72 |
| 5 | 0.2 | 0.2 | 0 | 38 |
| Ex. 1 | 0.3 | 0.2 | 0 | 95 |

*Example 6.*—Three different ratios of vinyl chloride and methyl acrylate were copolymerized by the first procedure described in Example 3, but varying the concentrations of methyl cellulose and alkyl aryl sulfonate, with the following results:

| | Parts methyl cellulose | Parts alkyl aryl sulfonate | Percent product passing 70-mesh screen |
|---|---|---|---|
| 95 PARTS VINYL CHLORIDE/5 PARTS METHYL ACRYLATE | | | |
| 1 | 0.3 | 0.075 | 44 |
| 2 | 0.3 | 0.1 | 86 |
| 3 | 0.3 | 0.2 | 71 |
| 4 | 0.3 | 0.3 | 46 |
| 5 | 0.4 | 0.1 | 92 |
| 6 | 0.2 | 0.2 | 58 |
| 7 | 0.3 | 0.2 | 53 |
| 8 | 0.4 | 0.2 | 78 |
| 50 PARTS VINYL CHLORIDE/50 PARTS METHYL ACRYLATE | | | |
| 9 | 0.5 | 0.4 | 61 |
| 10 | 0.75 | 0.6 | 71 |
| 11 | 1.0 | 0.5 | 66 |
| 25 PARTS VINYL CHLORIDE/75 PARTS METHYL ACRYLATE | | | |
| 12 | 0.3 | 0.2 | 60 |
| 13 | 0.3 | 0.3 | 84 |
| 14 | 0.5 | 0.2 | 68 |
| 15 | 0.5 | 0.3 | 73 |

That my particular combination of methyl cellulose dispersing agent and alkyl aryl sulfonate emulsifier has a specifically different effect in the suspension copolymerizations of vinyl chloride with other monoethylenically unsaturated compounds is shown by substituting other emulsifiers and other dispersants in the processes of the foregoing examples.

The first described procedure of Example 1 was carried out, only replacing the alkyl aryl sulfonate emulsifier by the same amount of a dioctyl sodium sulfonate succinate emulsifier available on the market. Precoagulation was bad; a tight deposit of polymer over 1 millimeter thick formed on the wall of the bomb. Most of the product was coarser than 20 mesh. When an alkyl ester sulfonate emulsifier available on the market was substituted for the alkyl aryl sulfonate emulsifier in Example 1, precoagulation was definitely present, as shown by a quite apparent coating on the walls of the bomb, and most of the product was coarser than 20 mesh. When the first described procedure of Example 3 was modified to use a polyoxyethylene lauryl ether emulsifier in place of the alkyl aryl sulfonate emulsifier, the reaction mixture precoagulated completely in the bomb.

The "Nacconol" emulsifier employed in each of the foregoing examples is a low salt content, alkyl benzene sulfonate prepared in the manner described in U.S.P. 2,652,427, in which the single alkyl substituents on the several benzene nuclei are each an alkyl radical corresponding to a hydrocarbon of a petroleum distillate boiling substantially in the range 180°–300° C.

My invention is not limited to the specific operating conditions employed in the foregoing examples. Minimum amounts of the methyl cellulose present in the polymerization mixture have been stated above. Larger amounts than those specifically disclosed herein for preferred operations may be used, short of employing such an excess as would unduly increase the costs of producing the polymers. In general, the copolymerizations are carried out at temperatures below 80° C., the minimum temperatures being dependent upon the activity at low temperatures of the particular catalyst used to promote the polymerization.

I claim:

1. In a suspension copolymerization wherein 10 to 95 parts vinyl chloride are copolymerized with 90 to 5 parts of other monoethylenically unsaturated $CH_2=C<$ monomer from the group consisting of the vinyl esters of the lower fatty acids and the acrylate esters dispersed in water containing a surface active agent to produce filterable polymer suspensions, that improvement which comprises dispersing the monomers in water containing as surface active agents a methyl cellulose having a solution viscosity of about 4000 and substantially 0.075% to 0.6% of a mononuclear alkyl aryl sulfonate emulsifier in which the aryl nucleus is a member of the group consisting of the benzene and toluene nuclei and each of said nuclei contains a single $C_{10}$ to $C_{20}$ alkyl substituent, the methyl cellulose being present in amount at least equal to the amount of the alkyl aryl sulfonate and no greater than about 5.0%, the amounts of said surface active agents being by weight of the monomers present.

2. The process of claim 1 in which the alkyl aryl sulfonate amounts to substantially 0.1% to 0.6% and the methyl cellulose amounts to substantially 0.1% to 1.0% by weight of the monomers.

3. The process of claim 1 in which the monoethylenically unsaturated $CH_2=C<$ monomer copolymerized with the vinyl chloride is 2-ethylhexyl acrylate.

4. The process of claim 2 in which the alkyl aryl sulfonated emulsifier is characterized by a low salt content and the alkyl substituents on the aryl nucleus corresponds to a hydrocarbon of petroleum distillates boiling substantially in the range 180° C. to 320° C.

5. The process of claim 1 in which the monoethylenically unsaturated $CH_2=C<$ monomer copolymerized with the vinyl chloride is a vinyl ester of a lower fatty acid.

6. The process of claim 2 in which the monoethylenically unsaturated $CH_2=C<$ monomer copolymerized with the vinyl chloride is vinyl acetate.

7. The process of claim 1 in which the monoethylenically unsaturated $CH_2=C<$ monomer copolymerized with the vinyl chloride is an acrylate ester.

8. The process of claim 2 in which the monoethylenically unsaturated $CH_2=C<$ monomer copolymerized with the vinyl chloride is methyl acrylate.

9. The process of claim 4 in which the monoethylenically unsaturated $CH_2=C<$ monomer copolymerized with the vinyl chloride is a vinyl ester of a lower fatty acid.

10. The process of claim 1 in which the monoethylenically unsaturated $CH_2=C<$ monomer copolymerized with the vinyl chloride is vinyl acetate.

11. The process of claim 4 in which the monoethylenically unsaturated $CH_2=C<$ monomer copolymerized with the vinyl chloride is an acrylate ester.

12. The process of claim 2 in which the monoethylenically unsaturated $CH_2=C<$ monomer copolymerized with the vinyl chloride is 2-ethylhexyl acrylate.

References Cited in the file of this patent

UNITED STATES PATENTS

| | | |
|---|---|---|
| 2,473,929 | Wilson | June 21, 1949 |
| 2,652,427 | Shultz | Sept. 15, 1953 |